(12) United States Patent
Tellier et al.

(10) Patent No.: US 10,477,621 B2
(45) Date of Patent: Nov. 12, 2019

(54) CONTROL FOR ELECTRICAL HEATING CIRCUIT, IN PARTICULAR FOR MOTOR VEHICLE

(71) Applicant: Valeo Systemes Thermiques, Le Mesnil Saint Denis (FR)

(72) Inventors: Laurent Tellier, Paris (FR); Bertrand Puzenat, Montigny-le-Bretonneux (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 314 days.

(21) Appl. No.: 14/896,927

(22) PCT Filed: May 15, 2014

(86) PCT No.: PCT/EP2014/060031
§ 371 (c)(1),
(2) Date: Dec. 9, 2015

(87) PCT Pub. No.: WO2014/202293
PCT Pub. Date: Dec. 24, 2014

(65) Prior Publication Data
US 2016/0143090 A1     May 19, 2016

(30) Foreign Application Priority Data
Jun. 17, 2013   (FR) ...................................... 13 55673

(51) Int. Cl.
*H05B 1/02*         (2006.01)
(52) U.S. Cl.
CPC ............. *H05B 1/0236* (2013.01); *H05B 1/02* (2013.01)
(58) Field of Classification Search
CPC ....... B60H 1/2218; H05B 1/02; H05B 1/0236
See application file for complete search history.

(56) References Cited

U.S. PATENT DOCUMENTS 3,365,654 A * 1/1968 Johnston ............ G05D 23/1913
                                                       219/501
3,585,481 A * 6/1971 Steghart ............. G05D 23/2453
                                                       318/610
(Continued)

FOREIGN PATENT DOCUMENTS

DE    10 2008 056 757 A1    6/2009
DE    10 2010 005 671 B3    6/2011
(Continued)

OTHER PUBLICATIONS

Translation EP 1371519.*
(Continued)

*Primary Examiner* — Ibrahime A Abraham
*Assistant Examiner* — Frederick F Calvetti
(74) *Attorney, Agent, or Firm* — Osha Liang LLP

(57) ABSTRACT

A device (1) for controlling an electrical heating circuit (2) comprising a number N of heating elements (21-23) connected in parallel, comprises, according to the invention: N electronic switches ($T_1$-$T_3$), each able to be connected in series with one of the N heating elements (21-23); a module (10) able to receive a power setpoint in the form of a control signal (PWM) with duty ratio varying as a function of power; means (12) for extracting a mean value (formula (I)) of the control signal (PWM) received; and P comparators ($C_1$-$C_3$), the integer P being less than or equal to N, which are able to compare the mean value (formula (I)) extracted with P distinct threshold values ($Ref_1$-$Ref_3$) and to generate P comparison signals ($S_1$-$S_3$), each comparison signal serving to control a toggling of the electronic switch ($T_1$-$T_3$) associated with at least one heating element into the open or closed position.

8 Claims, 3 Drawing Sheets

(56) References Cited

U.S. PATENT DOCUMENTS

| | | | | |
|---|---|---|---|---|
| 3,733,463 A * | 5/1973 | Low | ................ | G05D 23/1913 219/499 |
| 5,354,965 A * | 10/1994 | Lee | ................ | B60S 1/488 15/250.05 |
| 6,124,576 A * | 9/2000 | Zapf | ................ | H05B 3/746 219/464.1 |
| 6,940,050 B2 * | 9/2005 | Probst | ................ | G05D 23/1951 219/205 |
| 9,609,692 B2 * | 3/2017 | Bilchinsky | ................ | H05B 6/705 |
| 10,002,779 B2 * | 6/2018 | Swanson | ................ | H05B 3/20 |
| 2004/0099653 A1 * | 5/2004 | Hirayama | ................ | G05B 15/02 219/482 |
| 2005/0061798 A1 * | 3/2005 | Uhl | ................ | B60H 1/2218 219/494 |
| 2006/0289462 A1 * | 12/2006 | Muramatsu | ................ | B60H 1/2218 219/501 |
| 2007/0194009 A1 * | 8/2007 | Seger | ................ | H05B 1/0236 219/600 |
| 2008/0223842 A1 * | 9/2008 | Petrenko | ................ | H05B 3/84 219/203 |
| 2013/0062334 A1 * | 3/2013 | Bilchinsky | ................ | H05B 6/705 219/482 |
| 2013/0087545 A1 * | 4/2013 | Bilchinsky | ................ | H05B 6/705 219/385 |
| 2013/0105457 A1 * | 5/2013 | Swanson | ................ | H05B 3/20 219/209 |
| 2013/0105463 A1 * | 5/2013 | Schmidt | ................ | H05B 3/20 219/482 |
| 2013/0105465 A1 * | 5/2013 | Swanson | ................ | H05B 3/20 219/508 |
| 2013/0341318 A1 * | 12/2013 | Nagasaka | ................ | H05B 1/0236 219/483 |

FOREIGN PATENT DOCUMENTS

| | | |
|---|---|---|
| EP | 1 371 519 A1 | 12/2003 |
| JP | 2009-191842 A | 8/2009 |

OTHER PUBLICATIONS

Translation CN 101434184 (Year: 2009).*
International Search Report issued in corresponding application No. PCT/EP2014/060031 dated Jul. 3, 2014 (2 pages).

* cited by examiner

CONTROL FOR ELECTRICAL HEATING CIRCUIT, IN PARTICULAR FOR MOTOR VEHICLE

The present invention relates generally to the control of an electric heating circuit comprising a plurality of heating elements connected in parallel.

The invention relates notably to the field of motor vehicles in which it is known practice to install an electric heating circuit (heater or additional radiator) in the heating, ventilation and air conditioning system of a vehicle with heat engine to ensure the rapid heating of the vehicle interior when the vehicle starts to operate, and before the heat of the engine itself ensures such heating. The electric heater is used more particularly to heat the water of the vehicle cooling circuit. It generally comprises a plurality of resistive heating elements connected in parallel, preferably PTC (positive temperature coefficient) elements, which have to be controlled as a function of an operating setpoint.

Currently, the electric radiators with embedded electronics have an operating setpoint that can be of three types:

For the radiators with so-called "logic" control, two setpoint wires are connected to the input of a control device which makes it possible, by combinational logic, to control up to three heating elements in order to reach four different power levels (0%, 33%, 67%, 100%). This operation makes it possible to control each element separately, while using simple control electronics in which the presence of a microcontroller is pointless. Nevertheless, this solution requires at least two setpoint wires.

For the radiators with so-called PWM (pulse width modulation) control, a single setpoint wire makes it possible to adjust the power setpoint in the form of a PWM signal at low frequency (typically of the order of a few tens or hundreds of hertz). The latter comprises a microcontroller which interprets the power setpoint received and drives, proportionally (or according to a more complex law), the heating elements, generally by also using PWM control signals at lower frequencies than that of the PWM signal used for the power setpoint. In this case, the control is not therefore done element by element. Furthermore, although more accurate, this solution is costly given the need to have a microcontroller.

Finally, according to a variant that is possible with the radiators with PWM control, some radiators with bus control have been developed, for which the power setpoint arrives not in the form of a PWM signal, but in the form of a digital signal conveyed by a communication bus of LIN, CAN or equivalent type. Here again, the presence of a microcontroller is essential.

The aim of the present invention is to propose a solution that makes it possible to combine the advantages offered by the known solutions, without exhibiting the drawbacks thereof. In particular, the proposed solution makes it possible for the control device to control the heating circuit from a PWM setpoint signal received over a single setpoint wire, without the need for a microcontroller.

The present invention meets this objective by proposing a method for controlling an electric heating circuit comprising a number N of heating elements connected in parallel, each heating element being able to be connected in series with an associated electronic switch, the method comprising the following steps:

reception of a power setpoint in the form of a PWM control signal of variable duty cycle as a function of the power;

extraction of an average value of the received PWM control signal;

execution of P comparisons, the integer P being less than or equal to N, of the extracted average value with P distinct threshold values and generation of P comparison signals, each comparison signal being used to control a switching over of the electronic switch associated with at least one heating element to the open or closed position.

According to other possible features:

the integer P is equal to N, such that each comparison signal serves to control the electronic switch associated with a single heating element.

For each of the P comparisons, the comparison signal generated is suitable for:

controlling a switching over of the associated electronic switch to the open position if the extracted average value is less than the threshold value;

controlling a switching over of the associated electronic switch to the closed position otherwise.

Another subject of the invention is a device for controlling an electric heating circuit comprising a number N of heating elements connected in parallel, the control device comprising:

N electronic switches, each able to be connected in series with one of the N heating elements;

an electronic reception module suitable for receiving a power setpoint in the form of a PWM control signal of variable duty cycle as a function of the power;

means for extracting an average value of the PWM control signal received;

P comparators, the integer P being less than or equal to N, suitable for comparing the extracted average value with P distinct threshold values and generating P comparison signals, each comparison signal serving to control a switching over of the electronic switch associated with at least one heating element to the open or closed position.

Advantageously, the control device can further comprise means for generating the P threshold values. These means comprise, for example, a divider bridge with P+1 resistors in series, subject to a reference voltage, each link point between two resistors of the divider bridge giving an increasing threshold value between two successive link points.

Preferably, each comparator of the device is suitable for delivering a comparison signal which is itself suitable for:

controlling a switching over of the associated electronic switch to the open position if the extracted average value is less than the threshold value;

controlling a switching over of the associated electronic switch to the closed position otherwise.

The invention will be better understood and other aims, details, features and advantages thereof will become more clearly apparent from the following description of particular embodiments of the invention, given purely as an illustrative and nonlimiting example, with reference to the attached drawings, in which.

Figure 1:
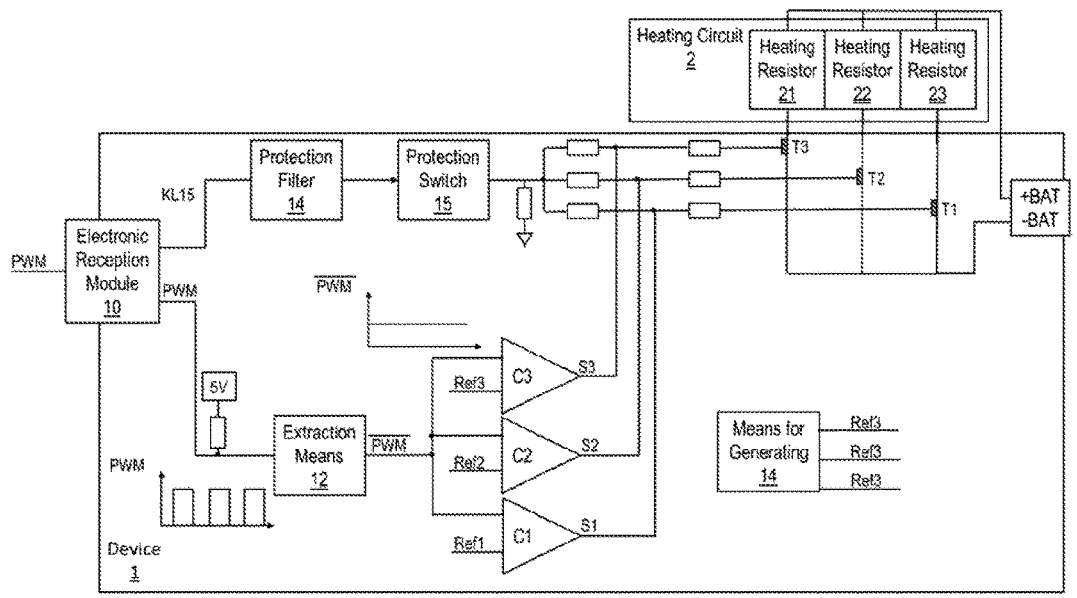
FIG. 1 illustrates, in the form of a simplified block diagram, an exemplary control device according to the present invention.
Figure 3:
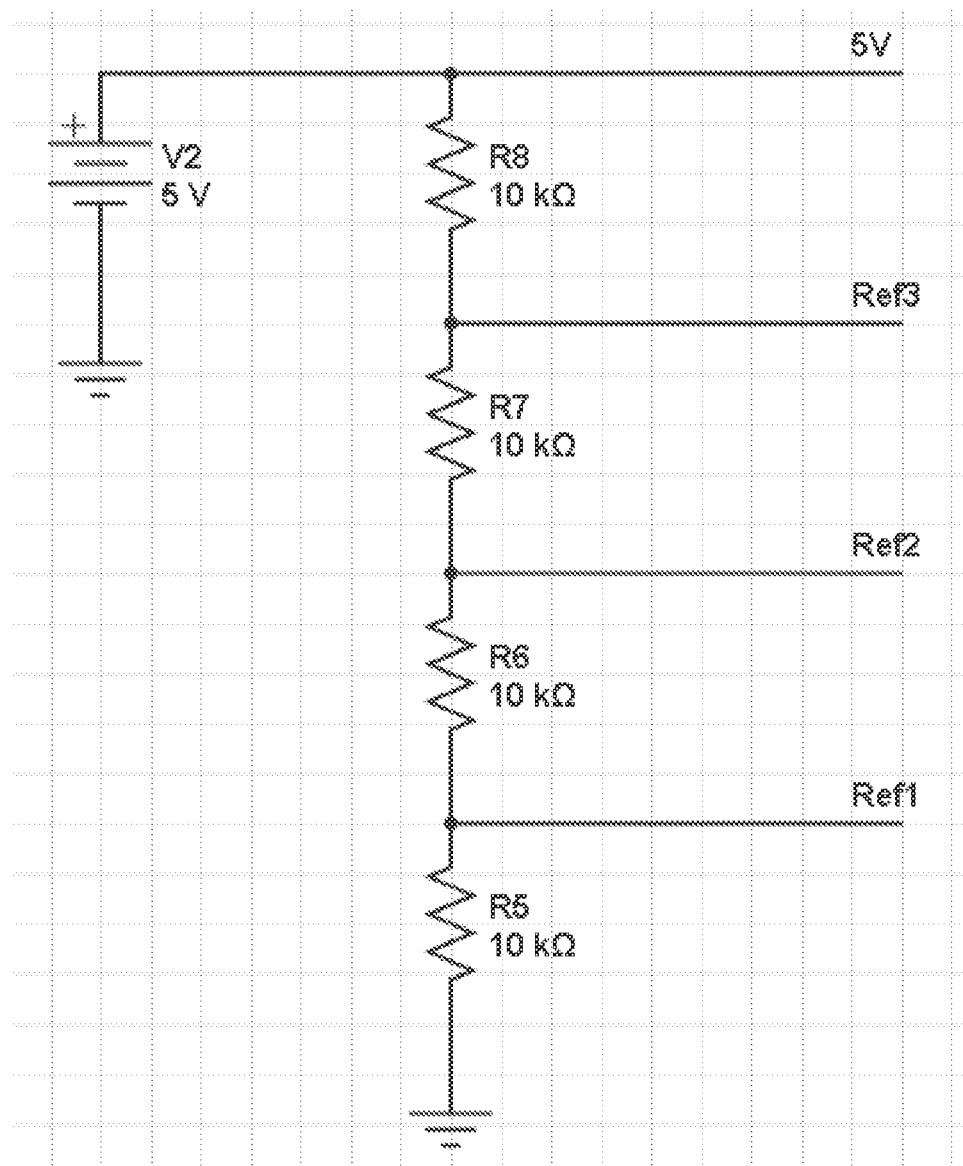
Figure 4:
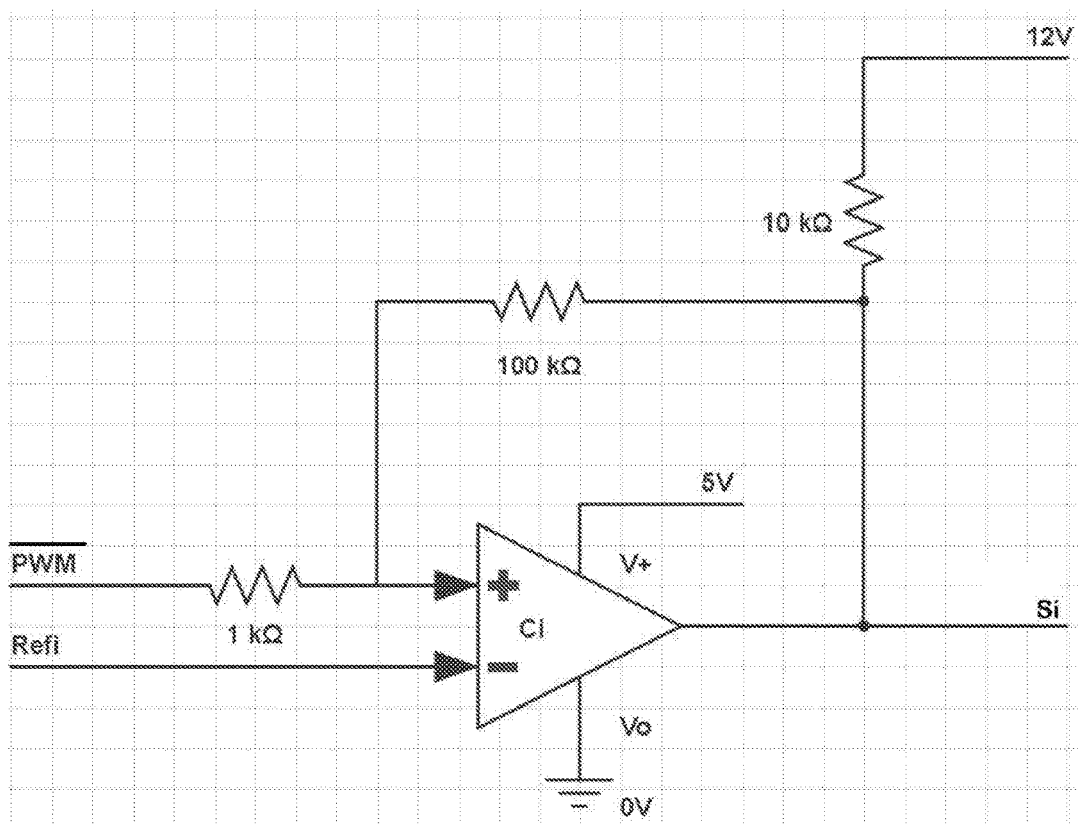

FIG. 3 gives an example of implementation of a subassembly included in the control device of FIG. 1 for the generation of reference DC voltages;

FIG. 4 gives an example of implementation of another subassembly included in the control device of FIG. 1.

In the various attached figures, common elements bear the same references.

FIG. 1 illustrates, in simplified form, an exemplary embodiment of a device 1 for controlling a heating circuit 2, from a power setpoint received in the form of a PWM signal over a single setpoint wire. As a nonlimiting example, the heating circuit 2 here consists of three heating resistors 21, 22, 23, preferably PTC resistors, connected in parallel. The control device 1 comprises, conventionally, three electronic switches $T_1$, $T_2$ and $T_3$, for example three MOS power transistors, each being able to be connected in series with one of the three heating resistors 21, 22, 23, and to allow a current to pass or prevent a current from passing through these resistors according to their closed or open state.

The PWM signal is a periodic signal of constant period T, corresponding to a frequency of the order of a few tens of hertz. During a period T, the PWM signal alternates between a high level and a low level. The characteristics of this alternation make it possible to inform the device 1 of the power setpoints to be applied.

In certain cases, the PWM signal can be delivered by the output of a bipolar or MOS transistor used as open emitter (respectively source).

As a variant, the PWM signal is delivered by the output of a pair of push-pull-mounted transistors.

The two ways of generating the PWM signal are equivalent from the point of view of the present invention. In particular, in both cases, the required operating power is communicated by virtue of the duty cycle of the PWM signal, this duty cycle being defined as being the time for which the high state is maintained over the period of the PWM signal. In certain cases, set by convention, the required operating power is communicated by virtue of the negative duty cycle of the PWM signal, this negative duty cycle being defined as the time for which the low state is maintained over the period of the PWM signal.

Hereinafter in the explanation, it has been assumed, in a nonlimiting manner, that the PWM signal originates from an open-collector or open-drain transistor, and that the required power is communicated by the negative duty cycle. In this case, the higher the negative duty cycle, the greater the required power. For example, for a variation between 5% and 95% of the negative duty cycle, there will be a corresponding variation of 100% to 0% of the maximum heating power, the maximum heating power being obtained when all the heating resistors 21-23 are simultaneously operating.

Figure 2:
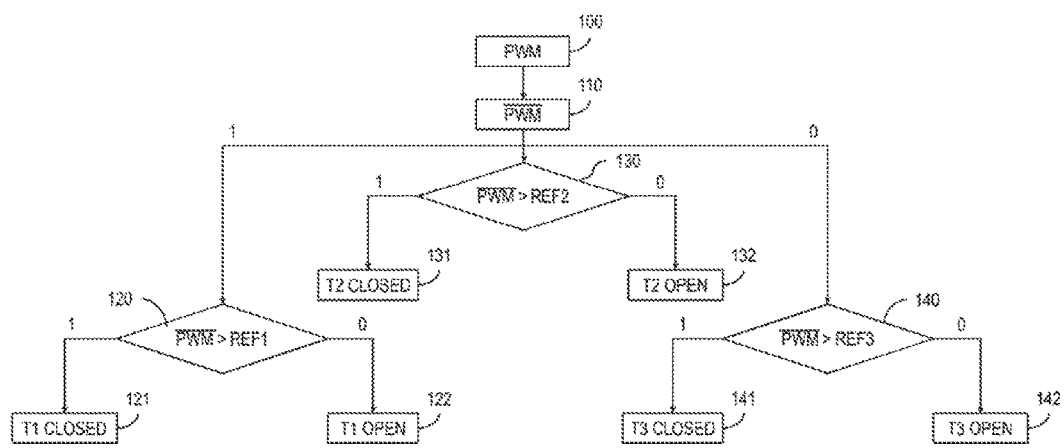
FIG. 2 illustrates steps implemented by the control device according to the present invention.

Referring to FIGS. 1 and 2, the PWM signal is first of all received, in a step 100, by the control device 1 at a connector forming an electronic reception module 10. Given the fact that this PWM signal corresponds to the output of a bipolar or MOS transistor with open collector or drain, a pull-up resistor 11 of a pull-up circuit is conventionally used to pull the PWM signal up to a reference voltage, for example of 5 volts. The appearance of the PWM signal is schematically illustrated below the pull-up resistor 11.

According to the invention, the device 1 will then transform the PWM signal received into a quasi-constant signal, the value of which is substantially proportional to the duty cycle (in the negative example) of the PWM signal. To do this, the device 1 will extract, in an extraction step 110, the average value $\overline{PWM}$ of the PWM control signal PWM received. This can be obtained very simply by using as extraction means 12 a low-pass RC filter with a time constant that is very much greater than the period T of the PWM signal. As an example, it is possible to use a resistor with a value of the order of 4.7 Kohms, and a capacitor with a capacitance of the order of 10 μfarads.

The appearance of the averaged signal $\overline{PWM}$ duly obtained at the end of the step 110 is schematically illustrated in FIG. 1.

The averaged signal $\overline{PWM}$ will then be the subject of three comparisons (steps 120, 130 and 140 in FIG. 2) with three distinct threshold values $Ref_1$, $Ref_2$ and $Ref_3$.

For this, the device 1 comprises means 13 for generating the three threshold values, and three comparators $C_1$, $C_2$, $C_3$, each comparator $C_i$ (the integer i varying from 1 to 3) having its output connected to the input (here the gate) of the transistor $T_i$.

As illustrated in FIG. 3, the means 13 for generating the three threshold values can be produced very simply from a divider bridge comprising four resistors R6 to R9 in series, subject to the reference voltage. Each link point between two resistors gives a threshold value $Ref_1$, $Ref_2$ and $Ref_3$ such that $$Ref_1 < Ref_2 < Ref_3$$

The resistors R6 to R9 preferably have the same value so as to give an identical weight to each of the heating resistors 21 to 23.

The comparison signals $S_1$ to $S_3$ generated at the output of the comparators $C_1$ to $C_3$ will serve to control a switching over of the electronic switch $T_1$ to $T_3$ associated with at least one heating element to the open or closed position.

As an example, the comparison signal $S_i$ (i varying from 1 to 3) generated at the output of the comparator $C_i$ is suitable for:

controlling a switching over of the associated electronic switch $T_i$ to the open position if the extracted average value $\overline{PWM}$ is less than the threshold value $Ref_i$ (steps 122, 132 and 142 in FIG. 2);

controlling a switching over of the associated electronic switch $T_i$ to the closed position otherwise (steps 121, 131, 141 in FIG. 2).

The control device 1 according to the invention thus makes it possible to discretize the PWM signal received into a few power levels, here three power levels corresponding to the three threshold values $Ref_1$, $Ref_2$ and $Ref_3$, to allow for a stepped control of at least one heating element.

In a preferred embodiment, as many threshold values are generated as there are heating resistors to be controlled.

Thus, in the example given, it is possible to control the simultaneous operation:

of zero heating elements, for example with a negative duty cycle of the order of 5%. In this case, all the switches $T_1$ to $T_3$ are open.

of a single heating element, typically the resistor 21, with a negative duty cycle of the order of 25%. In this case, only the switch $T_1$ is closed and the switches $T_2$ and $T_3$ are open.

of two heating elements, typically the resistors 21 to 22, with a negative duty cycle of the order of 50%. In this case, the switches $T_1$ and $T_2$ are closed and only the switch $T_3$ is open.

of three heating elements 21 to 23, with a negative duty cycle of the order of 75%. In this case, all the switches $T_1$ to $T_3$ are closed.

Nevertheless, it is possible to envisage, without departing from the scope of the invention, conducting a number P of comparisons which is less than the number N of heating elements to be controlled, and of then using the output of one comparator to control a number of heating elements.

To avoid any risk of pumping in the case where the average value $\overline{PWM}$ is close to one of the threshold values, each comparator $C_i$ is preferably associated with a hysteresis circuit. An exemplary embodiment is illustrated in FIG. 4, in which the hysteresis is obtained by a feedback loop from the output of the comparator to the positive input of the comparator $C_i$, through a resistor.

Returning to FIG. 1, and although it is not directly related to the principle of the invention, the connector 10 forming a PWM signal reception means is further advantageously suitable for also receiving a KL15 signal corresponding to the battery voltage of the vehicle, typically of the order of 12 volts, only when the motor of the heating, ventilation and air conditioning system of the vehicle is actually operating. This KL15 signal is thus combined with the signals $S_i$ on the gates of the transistors T1. Various protections are advantageously used, such as a protection filter 14, and a protection switch 15 likely to switch over to the open position for example in the case of voltage overload or underload.

The invention claimed is:

1. A method for controlling an electric heating circuit comprising a positive number N of heating elements connected in parallel, each heating element connected in series with an associated electronic switch, the method comprising:
  receiving, by a connector/receiver, a power setpoint in the form of a pulse width modulation (PWM) control signal of variable duty cycle as a function of the power;
  transferring, by the connector/receiver, an equivalent PWM signal with the variable duty cycle and a power amplitude, the equivalent PWM signal and the power amplitude being based on a reference voltage supplied by a pull up resistor;
  obtaining, by a low-pass RC filter, an average value of the received PWM control signal, the PWM control signal being transferred directly from the connector/receiver to the low-pass RC filter;
  comparing, by a positive number P of comparators, the average value of the received PWM control signal to a corresponding positive number P of threshold values;
  generating a positive number P of comparison signals based on each of the positive number P of comparisons performed by the positive number P of comparators; and
  switching, using the positive number P of comparison signals, a positive number N of electronic switches corresponding to the positive number N of heating elements from an open position to a closed position or from a closed position to an open position,
  wherein:
    P is greater than or equal to 1 and less than or equal to N, and
    processing the PWM control signal, processing the equivalent PWM signal, and controlling the electric heating circuit is performed without using a microcontroller.

2. The method as claimed in claim 1, wherein:
  when P is equal to N, each of the positive number P of comparison signals control each of the positive number N of electronic switches associated with at least one out of the positive number N of heating elements.

3. The method as claimed in claim 1, wherein, for each of the positive number P of comparisons, each of the number P of comparison signals generated further cause each of the positive number N of electronic switches associated with at least one out of the positive number N of heating elements to:
  switching the associated electronic switch to the open position if the extracted average value is less than the threshold value; and
  switching the associated electronic switch to the closed position if the extracted average value is greater than the threshold value.

4. A device for controlling an electric heating circuit comprising a positive number N of heating elements connected in parallel, the control device comprising:
  a positive number N of electronic switches, each connected in series with one out of the positive number N of heating elements, the positive number N of electronic switches:
    correspond to the positive number N of heating elements, and
    switch from an open position to a closed position or from a closed position to an open position based on the positive number P of comparison signals;
  a connector/receiver that:
    receives a power setpoint in the form of a pulse width modulation (PWM) control signal of variable duty cycle as a function of the power, and
    transfers an equivalent PWM signal with the variable duty cycle and a power amplitude, the equivalent PWM signal and the power amplitude being based on a reference voltage supplied by a pull up resistor;
  a low-pass RC filter, with a time constant greater than a period of the PWM control signal, that obtains an average value of the PWM control signal received directly from the connector/receiver to the low-pass RC filter;
  a positive number P of comparators that, when P is less than or equal to N:
    compare the obtained average value with a corresponding positive number P of threshold values, and
    generate a positive number P of comparison signals based on each of the positive number P of comparisons performed by the positive number P of comparators; and
  wherein the device processes the PWM control signal, processes the equivalent PWM signal, and controls the electric heating circuit without using a microcontroller.

5. The control device as claimed in claim 4, further comprising:
  a divider bridge that generates the positive number P threshold values.

6. The control device as claimed in claim 5, wherein:
  said divider bridge comprises a positive number P+1 of resistors in series, subject to a new reference voltage different and distinct from a source voltage, and
  each node between every two resistors of the divider bridge supplies an increasing threshold value between two successive nodes.

7. The control device as claimed in claim 4, wherein each of the positive number P of comparators supply a corresponding comparison signal that:
  switches the associated electronic switch to the open position if the extracted average value is less than the threshold value, and
  switches the associated electronic switch to the closed position if the extracted average value is greater than the threshold value.

8. A method for controlling an electric heating circuit comprising a plurality of heating elements connected in parallel, each heating element connected in series with an associated electronic switch, the method comprising:
  receiving, by a connector/receiver, a pulse width modulation (PWM) control signal of variable duty cycle;
  transferring, by the connector/receiver, an equivalent PWM signal with the variable duty cycle, an amplitude of the variable duty cycle being based on a reference voltage supplied by a pull up resistor;

obtaining, by a low-pass RC filter, an average value of the received PWM control signal, the PWM control signal being transferred directly from the connector/receiver to the low-pass RC filter;

comparing, by a plurality of comparators, the average value of the received PWM control signal to a corresponding threshold value, the corresponding threshold value being unique to each comparator out of the plurality of comparators;

generating a plurality of comparison signals based on each of the comparisons performed by the plurality of comparators; and switching, using the plurality of comparison signals, a plurality of electronic switches from an open position to a closed position or from a closed position to an open position, each electronic switch out of the plurality of electronic switches corresponding to each heating element out of the plurality of heating elements, wherein:
  processing the PWM control signal, processing the equivalent PWM signal, and controlling the electric heating circuit is performed without using a microcontroller.

* * * * *